Aug. 29, 1939.   H. G. KAMRATH   2,170,902
CARBURETOR AIR CLEANER AND SILENCER ASSEMBLY
Filed Oct. 28, 1936
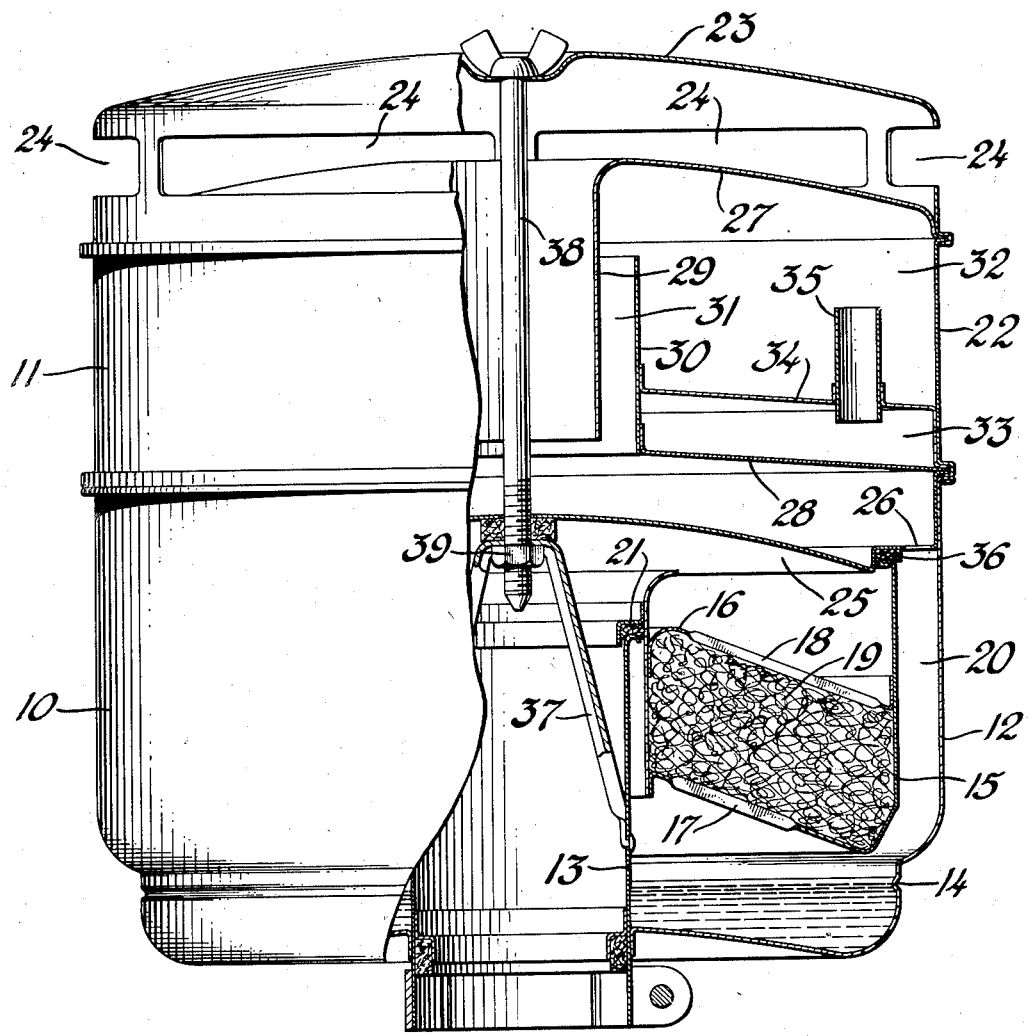
Inventor
Herbert G. Kamrath
By Blackmore, Spencer & Flint
Attorneys Patented Aug. 29, 1939

2,170,902

UNITED STATES PATENT OFFICE

2,170,902

CARBURETOR AIR CLEANER AND SILENCER ASSEMBLY

Herbert G. Kamrath, Flint, Mich., assignor to General Motors Corporation, Detroit, Mich., a corporation of Delaware Application October 28, 1936, Serial No. 107,947

3 Claims. (Cl. 183—15)

This invention has to do with air cleaner and silencer assemblies for internal combustion engine carburetors.

The principal object of the invention is to provide a compact assembly of a liquid bath air cleaner and a resonator silencer for internal combustion engines equipped with downdraft carburetors in which the air cleaner is disposed beneath the silencer so that the assembly has a low center of gravity and affords a strong carburetor connection and the silencer serves as a cover for the air cleaner and is so constructed and disposed that air enters the air cleaner through it and it inhibits loss of liquid from the air cleaner as a result of splashing or backfiring of the engine.

For a more complete understanding of the objects and nature of this invention, reference is made to the following specification wherein there is described the preferred embodiment of the invention which is shown in the accompanying drawing.

In the accompanying drawing, the single figure shows, partly in side elevation and partly in longitudinal section, an air cleaner and silencer assembly in accordance with my invention.

The air cleaner and silencer assembly which is shown in the drawing consists of an air cleaner 10 and a silencer 11 which constitutes a cover for the air cleaner.

The air cleaner 10 includes a cup-shaped member 12 and a tube 13 which is coaxial with and extends through and is secured in the bottom of the cup-shaped member and defines therewith an annular receptacle which is filled with oil or some other suitable liquid to about the level of the bead 14 before the assembly is put into use.

Within the annular receptacle defined by the cup-shaped member 12 and the tube 13, there is disposed an annular filter element 15. The filter element 15 consists of an annular shell 16, with rings of air inlet and air outlet orifices 17 and 18 in its lower and upper walls, filled with a filter medium 19 wetted with the liquid the annular receptacle contains. The bottom of the filter element is positioned above the liquid level in the annular receptacle and the outer side wall thereof is separated from the side wall of the cup-shaped member 12 by an annular aperture 20. The filter element is supported by the tube 13 through an annular element 21 which is secured to the inner cylindrical wall of the former and rests on the upper end of the latter.

The silencer 11 includes a cylindrical shell 22 whose diameter is approximately equal to that of the cup-shaped member 12. Over the upper end of the shell 22, there is secured a cover 23 shaped like an inverted shallow cup with a ring of air inlet orifices 24 in its side wall. Over the lower end of the shell 22, there is disposed a member 25 shaped like a shallow cup with a ring of air outlet orifices 26 in its bottom near its side wall. The member 25 is secured to the shell 22 by spinning a flange on the lower end of the latter over a flange on the upper end of the former.

Within the joint between the cover 23 and the shell 22, there is secured the outer margin of the upper head 27 of the silencer. Within the joint between the member 25 and the shell, there is secured the outer margin of the lower head 28 of the silencer. In the head 27, there is a central orifice encircled by a tube 29 which is coaxial with the shell 22 and extends almost to its lower end. In the head 28, there is a central orifice in which there is secured a tube 30 which is coaxial with and of considerably larger diameter than the tube 29. The tube 30 extends upwardly toward but terminates short of the head 27 and encircles and defines with the tube 29 an annular aperture 31. The compartment defined by the shell 22, its heads 27 and 28 and the tubes 29 and 30 is divided into chambers 32 and 33 by a partition 34. In the partition 34 whose outer margin is secured in the joint between the member 25 and the shell 22 and whose inner edge is secured to the tube 30, there is an orifice in which there is secured a tube 35.

The silencer 11 is assembled with the air cleaner 10 with the cup-shaped member 25 telescoped snugly within the upper end of the cup-shaped member 12 and the flange on the lower end of the shell 22 seated on the upper end of the cup-shaped member 12. The bottom of the cup-shaped member 25 is located a considerable distance above the upper end of the inner cylindrical wall of the filter element 15 and just within the ring of orifices 26 is seated on an extension of the outer cylindrical wall of the filter element through the intermediary of a sealing gasket 36. To secure the silencer to the air cleaner, there is provided a yoke 37 whose legs are secured to the tube 13 of the air cleaner, a thumbscrew 38 and a nut 39. The thumbscrew 38 extends through the cover 23, the duct defined by the tubes 29 and 30 and the cup-shaped member 25 of the silencer and the bight of the yoke 37 and the nut 39 is screwed on the lower end of the thumbscrew.

The air cleaner and silencer assembly which is shown in the drawing was designed for installation on internal combustion engines equipped with downdraft carburetors with the lower end of the tube 13 telescoped and clamped around the upper end of the air inlet tube of the carburetor. When the assembly is so installed and the engine on which it is installed is operating, air is drawn through the air inlet orifices 24 in the cover 23, the aperture between the end wall of the cover and the upper head 27 of the silencer and the duct defined by the tubes 29 and 30 into the aperture between the lower head 28 of the silencer and the bottom of the cup-shaped member 25. From the last mentioned aperture, the air passes through the orifices 26 into the upper end of the aperture 20 between the outer cylindrical wall of the filter element 15 and the side wall of the cup-shaped member 12 of the air cleaner. From the aperture 20, the air passes around the lower outer edge of the filter element, upwardly through the filter element (by way of the orifices 17 in its lower wall, the interstices in the filter medium 19 and the orifices 18 in its upper wall) into the aperture between the upper wall of the filter element and the bottom of the cup-shaped member 25 and, thence, through the tube 13 of the air cleaner into the carburetor and cylinders of the engine.

The chambers 32 and 33 of the silencer, together with the tube 35 which interconnects them and the aperture 31 which connects them to the duct defined by the tubes 29 and 30, define a compound resonator which is so tuned in the manner set forth in the Wilson application Serial No. 470,700 which was filed on July 25, 1930 that it responds to and attenuates by resonance the objectionable sound waves which issue from the air intake tube of the carburetor on which the assembly is installed. In the course of its passage from the lower end of the aperture 20 into the tube 13 of the air cleaner 10, the air is freed of dirt in a manner that requires no explanation. Thus the air cleaner and silencer assembly shown in the drawing cleans the air supplied to the carburetor and cylinders of the engine on which it is installed and silences the intake noises of the engine.

I claim:

1. In an air cleaner and silencer assembly: an air cleaner which includes a cup-like member, a tube which is secured in an opening in the bottom of the cup-like member and constitutes the air outlet duct of the assembly and with the cup-like member defines an annular receptacle which constitutes a liquid reservoir, and an annular filter element disposed within the annular receptacle with its outer side wall spaced from the side wall of the cup-like member so that it defines therewith an aperture through which air is conducted to the lower end of the filter element; and a silencer which includes a tubular structure which constitutes the air inlet duct of the assembly, a shell which encircles and is radially spaced from the tubular structure, walls which with the tubular structure and the shell define a compartment which constitutes a side branch of the air inlet duct, and a head with orifices in it near its outer edge secured over one end of the shell and spaced from the nearest end wall of the compartment so that it defines therewith an aperture through which air is conducted from the air inlet duct to the orifices in the head; the silencer being disposed over the upper end of the air cleaner with the lower end of the shell telescoped within the upper end of the side wall of the cup-like member and the head seated on an extension of the outer side wall of the filter element but spaced from the upper end of the tube so that it defines therewith an aperture through which air is conducted from the upper end of the filter element into the upper end of the tube and the orifices in the head opening into the upper end of the aperture defined by the outer side wall of the filter element and the side wall of the cup-like member.

2. In an air cleaner and silencer assembly: an air cleaner which includes a cup-like member, a tube which is secured in an opening in the bottom of the cup-like member and constitutes the air outlet duct of the assembly and with the cup-like member defines an annular receptacle which constitutes a liquid reservoir, and an annular filter element disposed within the annular receptacle with its outer side wall spaced from the side wall of the cup-like member so that it defines therewith an aperture through which air is conducted to the lower end of the filter element, and a silencer which includes a tubular structure which constitutes the air inlet duct of the assembly, a shell which encircles and is radially spaced from the tubular structure, walls which with the tubular structure and the shell define a compartment which constitutes a side branch of the air inlet duct, and a head with orifices in it near its outer edge secured over one end of the shell and spaced from the nearest end wall of the compartment so that it defines therewith an aperture through which air is conducted from the air inlet duct to the orifices in the head; the silencer being disposed over the upper end of the air cleaner in engagement with the side wall of the cup-like member and with the head seated on the outer side wall of the filter element but spaced from the upper end of the tube so that it defines therewith an aperture through which air is conducted from the upper end of the filter element into the upper end of the tube and the orifices in the head opening into the upper end of the aperture defined by the outer side wall of the filter element and the side wall of the cup-like member.

3. In an air cleaner and silencer assembly: an air cleaner which includes a cup-like member, a tube which constitutes the air outlet duct of the assembly secured in an opening in the bottom of the cup-like member, a filter element from which air passes into the tube disposed within the cup-like member with its outer side wall spaced from the side wall of the cup-like member so that it defines therewith an aperture through which air is conducted to the filter element; and a silencer which includes a shell, upper and lower heads for the shell, orifices in the lower head near its outer edge, and an air inlet orifice for the assembly from which air passes through the shell to the orifices in the lower head; the silencer being disposed over the upper end of the air cleaner with the lower end of the shell telescoped within the upper end of the side wall of the cup-like member and the lower head seated on the outer side wall of the filter element with the orifices in it opening into the upper end of the aperture defined by the outer side wall of the filter element and the side wall of the cup-like member.

HERBERT G. KAMRATH.